United States Patent
Tene et al.

(10) Patent No.: US 10,853,326 B2
(45) Date of Patent: Dec. 1, 2020

(54) SHARING COLLECTIONS WITH EXTERNAL TEAMS

(71) Applicant: Dropbox, Inc., San Francisco, CA (US)

(72) Inventors: Ran Tene, Tel Aviv (IL); Tal Pais, Shoham (IL); Justin Kwak, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 122 days.

(21) Appl. No.: 15/786,171

(22) Filed: Oct. 17, 2017

(65) Prior Publication Data

US 2019/0114331 A1 Apr. 18, 2019

(51) Int. Cl.
| | |
|---|---|
| G06F 16/176 | (2019.01) |
| G06F 16/23 | (2019.01) |
| G06F 16/93 | (2019.01) |
| G06F 16/11 | (2019.01) |
| G06F 16/16 | (2019.01) |
| G06F 16/28 | (2019.01) |
| H04L 29/08 | (2006.01) |
| G06F 21/62 | (2013.01) |
| G06F 16/9035 | (2019.01) |

(52) U.S. Cl.
CPC ......... *G06F 16/176* (2019.01); *G06F 16/122* (2019.01); *G06F 16/168* (2019.01); *G06F 16/23* (2019.01); *G06F 16/288* (2019.01); *G06F 16/9035* (2019.01); *G06F 16/93* (2019.01); *G06F 21/6218* (2013.01); *H04L 67/306* (2013.01)

(58) Field of Classification Search
CPC .................................................. G06F 16/176
See application file for complete search history.

(56) References Cited

U.S. PATENT DOCUMENTS

| | | | |
|---|---|---|---|
| 2004/0093397 A1* | 5/2004 | Chiroglazov | G06Q 10/10 709/219 |
| 2005/0060572 A1 | 3/2005 | Kung et al. | |
| 2008/0178278 A1 | 7/2008 | Grinstein et al. | |

(Continued)

OTHER PUBLICATIONS

Jay B. Carson et al., "Shared Leadership in Teams: An Investigation of Antecedent Conditions and Performance," The Academy of Management Journal, 50.5, Oct. 2007, pp. 1217-1234.

*Primary Examiner* — Van H Oberly
(74) *Attorney, Agent, or Firm* — Polsinelli PC

(57) ABSTRACT

The disclosed technology provides for sharing of collections between teams from external entities. The present technology allows administrators of an entity to manage what teams from their entity can be exposed outside of the entity and to manage how their entity is viewed by external partners. Sharing between teams provides benefits of easier sharing whereby it is not necessary to share a collection individually with all users of a team. It also provides a more logical sharing paradigm where collaboration is otherwise thought of between two partner entities and not specific employees of those entities. Sharing between teams allows an administrator to manage the user accounts associated with the team so that as team members come and go, all current team members will have access to projects in which the team is involved. Additionally, established teams can be configured to enjoy the full collaborative benefits of the content management system.

17 Claims, 12 Drawing Sheets

(56) References Cited

U.S. PATENT DOCUMENTS

| | | |
|---|---|---|
| 2009/0150968 A1* | 6/2009 | Ozzie .................. H04L 63/08 726/1 |
| 2014/0122690 A1 | 5/2014 | Rowe |
| 2015/0310188 A1 | 10/2015 | Ford et al. |
| 2016/0224996 A1 | 8/2016 | Hunt et al. |
| 2017/0041296 A1 | 2/2017 | Ford et al. |
| 2017/0180346 A1 | 6/2017 | Suarez et al. |

* cited by examiner

US 10,853,326 B2

SHARING COLLECTIONS WITH EXTERNAL TEAMS

TECHNICAL FIELD

The present technology pertains to sharing collections of content items, and more specifically pertains to sharing collections of content items with teams from external partners.

BACKGROUND

There exists many services for collaborating on projects. Many such services allow sharing of content items or collections with individuals. Some services recognize the existence of teams within a common organization, and allow sharing of content items or collections by teams. However known services for collaborating on projects don't have a mechanism to share content items or collections with defined teams from entities external to the users.

For example, known services for collaborating on projects will allow a first user to individually invite other users to collaborate on a project. Some services will also allow a first user as a member of a first entity (e.g., company or other organization) to invite a team within the first entity to collaborate on the project. But modern services for collaborating on projects won't allow a first user as a member of a first entity to invite a team from a second entity to collaborate on a project. This is a serious shortcoming to known collaboration tools as collaboration amongst entities has long been a common practice.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a collaboration service that can facilitate collaboration amongst teams from diverse entities. Collaboration amongst teams in different entities has long been a common practice. For example, it is quite common for a first entity to hire a contractor to develop a portion of a project. However modern collaboration tools do not permit or facilitate easy sharing of a project amongst teams from diverse entities. While it is possible using several different tools to invite individuals from outside entities to collaborate on content items or a collection, these tools do not permit sharing with teams from outside entities.

This is less than ideal because often, as in the contractor use case, a project is not necessarily limited to the individuals actively working on content items—there may be managers and other team members involved. One limitation of the sharing with individuals paradigm and the contractor example occurs when the individual to which a content item or collection has been shared leaves their employment with the contractor. When this occurs the project does not end, but because sharing was limited to individuals other members of the team at the contractor would be left in the dark. It is more desirable to share the project with the contractor entity or a team entity at the contractor. The present technology provides for forming and managing teams and permitting sharing of collections with teams including teams external to the entity that is sharing the collection.

In addition to providing a more logical way to share collections outside of an entity, the present technology also allows administrators of an entity to manage how their entity is viewed by external partners. For example an entity may make use of contractors, and would like to allow those contractors to collaborate with the entity's clients, but that entity would prefer that the contractors appear as full members of the entity and not expose the subcontractor relationship. Additionally an entity may have a management structure that they wish or do not wish to be exposed to their collaborators. The present technology permits administrators to configure teams within their entity to appear to external partners according to entity practices. These and other benefits will be described further herein.

Figure 1:
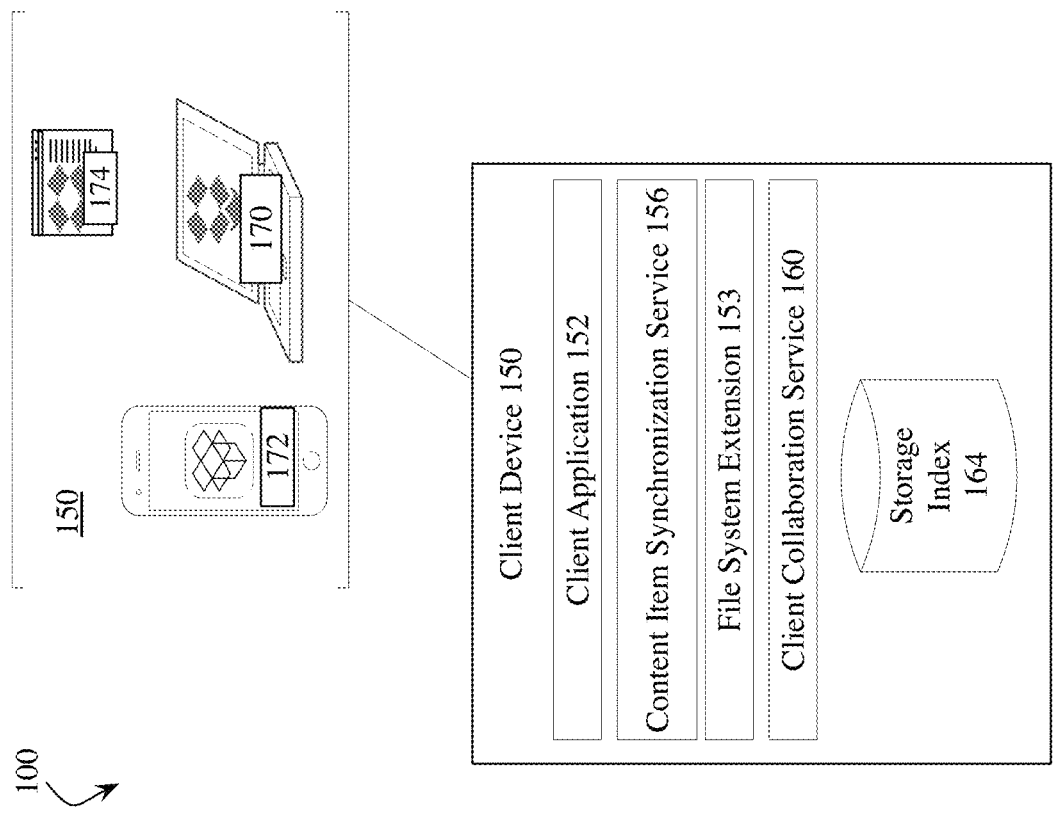
FIG. 1 shows an example of a content management system and client devices in accordance with some embodiments.
Figure 1:
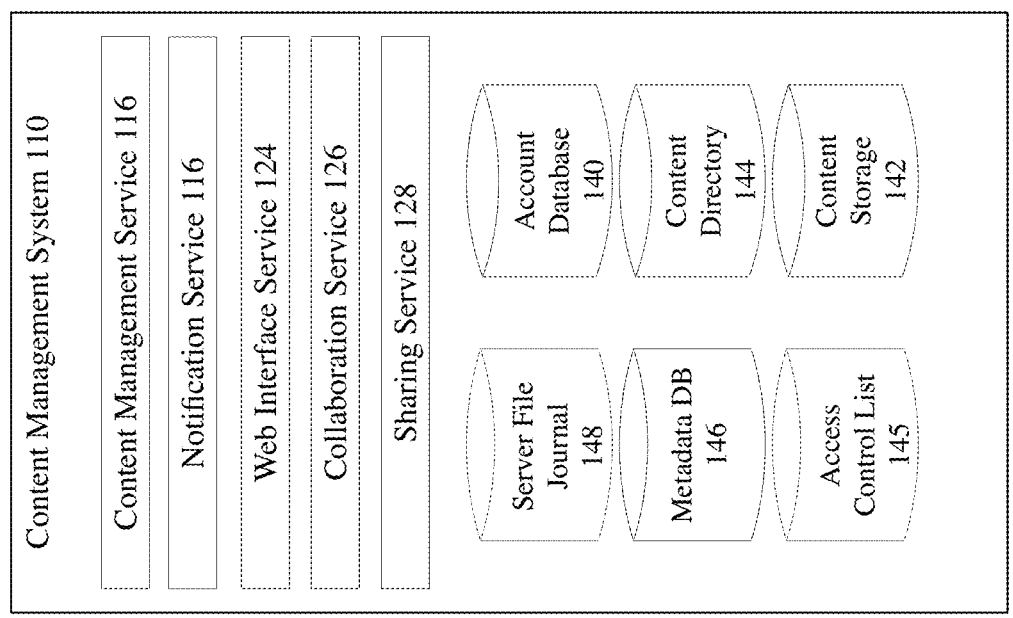

In some embodiments the disclosed technology is deployed in the context of a content management system having content item synchronization capabilities and collaboration features, among others. An example system configuration 100 is shown in FIG. 1, which depicts content management system 110 interacting with client device 150.

The present technology permits sharing of collections between teams for different entities. Sharing between teams provides benefits of allowing an administrator to manage the user accounts associated with the team so that as team members come and go, all current team members will have access to projects in which the team is involved. Additionally, established teams can be configured to enjoy the full collaborative benefits of content management system 110. For example, a prerequisite to forming a team can be to identify team members and give team members user accounts in the content management system 110. Since each team member has a user account, functions provided by the content management system 110 such as seen state, revision histories, tagging, commenting on content items, etc. can be available to external partners, as well as the team sharing the collection.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups/teams can have permissions based on group policies and/or access control lists, and members of the groups/teams can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 116. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
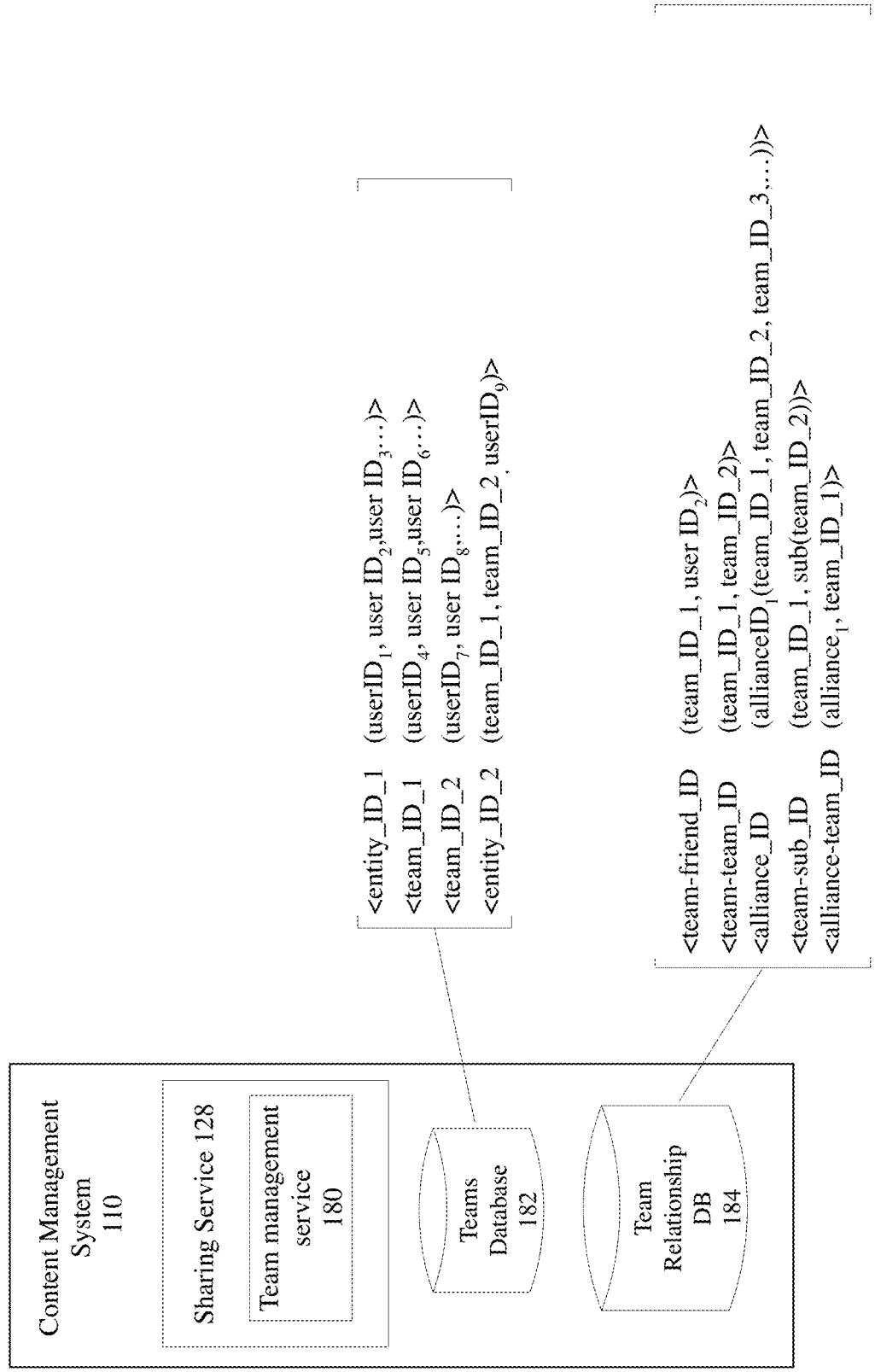
FIG. 2 shows an example of a content management system for sharing collections between team in accordance with some embodiments.

As addressed above the present technology provides for better management of teams within an entity and provides for sharing of collections between teams from diverse entities. FIG. 2 illustrates additional details of content management system 110 that are useful in the context of the team collaboration technology described herein.

As used herein, different entities refer to companies or other organizations that, outside of their collaboration on projects, are separate entities. They will often have their own defined legal formations. The entities will also not share an information technology infrastructure other that perhaps separately having relationships with common vendors. User accounts of one entity are not transferrable to another entity, and user accounts of one entity do not provide privileges with respect to another entity. In some embodiments, entities can be companies.

FIG. 2 illustrates an extension of sharing service 128, team management service 180. Team management service 180 can facilitate the creation of teams and storing information regarding teams in teams database 182. Team management service 180 can also facilitate collaboration relationships between teams, whether those teams are within a common entity or are within diverse entities, and store relationships between teams in team relationship database 184.

Teams database 182 can store data defining an entity or team and its members, and in some embodiments team database 182 can store team specific configuration data. An administrator of an entity can interact with team management service 180 to create a profile for the entity. By default, the entity can be associated with all teams or individuals within the entity. The administrator for the entity can create other teams within the entity and can nest teams within teams. In some embodiments an administrator for the entity may need to invite members to a team.

Teams database 182 can identify entities and teams by identifiers, and store user account identifiers for members of the respective team or respective entity. For example, as illustrated in FIG. 2, a first entity, "entity_ID_1" can include a plurality of users identified by their user account IDs. This first entity, might be a small entity and not require further division into teams. In contrast, a second entity "entity_ID_2" can be a larger entity and can be made up of users, and teams. For example, the second entity can be made up of team_ID_1, team_ID_2, and userID$_9$. As such, entities can be defined by teams and individual users.

Teams database 182 also defines teams such as team_ID_1, team_ID_2. Both teams consist of a plurality of users identified by their user IDs.

An administrator for the entity can keep the entity reflected in teams database 182 up to date by editing the teams and individuals associated with the entity as needed. Likewise, managers of teams or entity administrators can also manage the user accounts associated with individual teams and keep them up to day in team database 182.

Teams database 182 can also record configuration data for teams. Configuration parameters may include parameters that may expose or hide teams from the entity to external partners, hide individual members of a team, display or hide roles of such members, visibility of subcontractors, and visibility of team structures, etc. Configuration parameters can also influence the how the behavior of the team, in the context of specific features of content management system 110, is viewed by partner teams. For example, content management system 110 provides seen state and edit histories, commenting, etc. In some embodiments, a configuration parameter can affect how this type of data is viewed by external entities. For example, rather than edit histories reflecting the user accounts that provided the edits, a team can be configured so that edit histories reflect that edits were made by the team rather than a specific team member. Other configurations are also possible.

Team relationship database 184 can define relationships between two or more teams. In some embodiments the relationship between two or more teams can be apparent from the members that make up the relationship. While in some embodiments the relationship between two or more teams may be defined or edited by an administrator. FIG. 2 illustrates some different types of relationships between a team and another party. A team-friend relationship is a relationship between a team and an individual user. A team-team relationship is a relationship between two teams. An alliance his relationship between three or more teams. A team-subcontractor relationship is a relationship between a team and a subcontractor. And an alliance-team relationship is a relationship between alliance and another team. In some embodiments, the type of relationship can be used to determine an appropriate model or template for displaying relationship partners to other partners, e.g., as in the case of a team-team relationship, where one of the teams in the relationship is itself a team-subcontractor relationship.

Each of the relationships can be assigned a unique ID.

Figure 3:
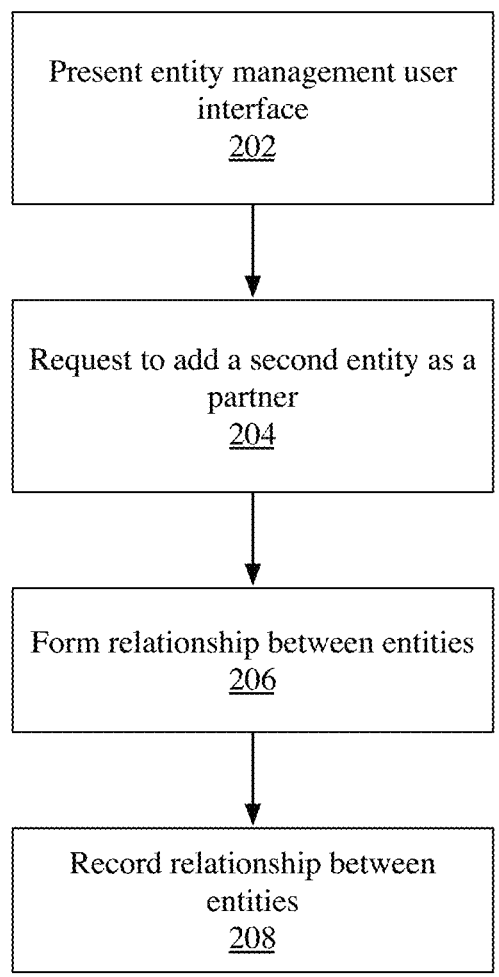
FIG. 3 shows an example method for establishing relationships between external entities in accordance with some embodiments.
Figure 4A:
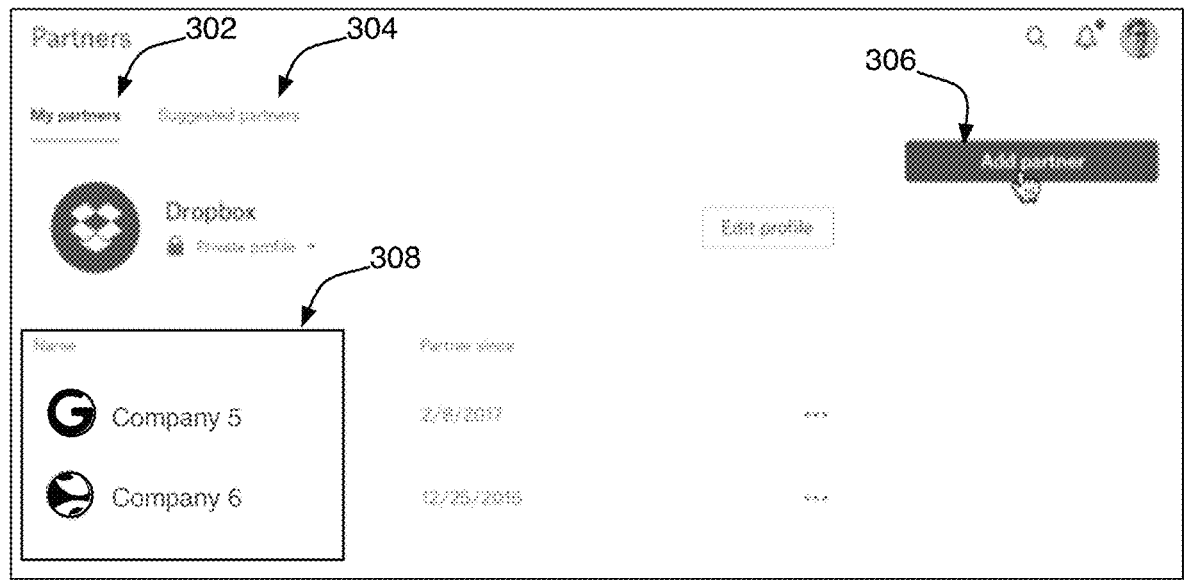
FIG. 4A, FIG. 4B, FIG. 4C show example entity management user interfaces in accordance with some embodiments.
Figure 4B:
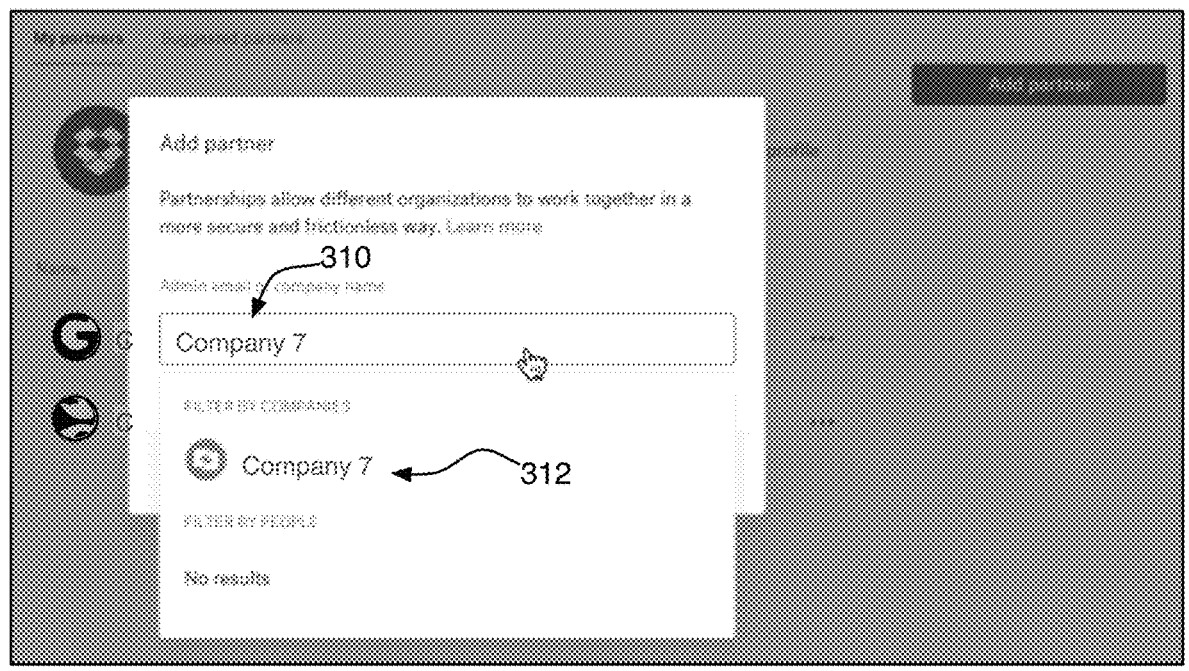

FIG. 3 illustrates an example method of forming a relationship between entities. Team management service can present (202) an entity management user interface such as illustrated in FIG. 4A. An administrator of a first entity can request (204) to add a second entity as a partner. For example, as illustrated in FIG. 4A, the entity management user interface includes "add partner" button 306. The administrator of the first entity can select this button to request (204) to add the second entity as a partner. Selection of "add partner" button 306 can cause team management service 180 to display the interface shown in FIG. 4B. The administrator of the first entity can type the name of the second entity in field 310. If the second entity is already in teams database 182 the second entity will appear in a list of results 312. If the second entity is not present in teams database 182, the administrator of the first entity can provide an email address of a team member of the second entity.

After requesting to add (204) a second entity as a partner, team management service 180 can form (206) a relationship between the first entity and the second entity by recording (208) the relationship between the first entity and second entity. In some embodiments team management service 180 waits to receive a confirmation from the second entity before forming (206) a relationship between the first entity and second entity.

Figure 4C:
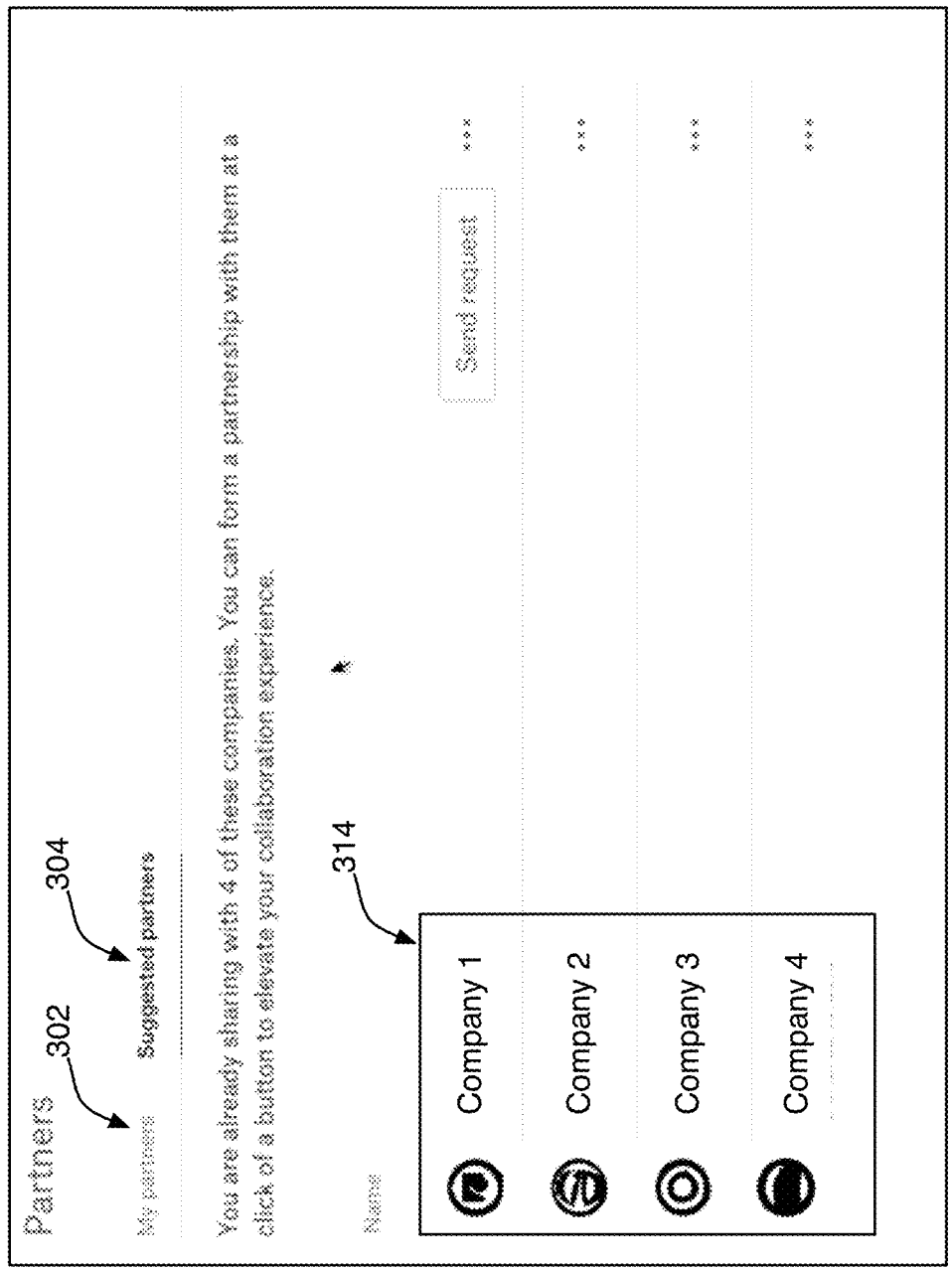

In addition to presenting controls to add new partners, entity management user interface illustrated in FIG. 4A also shows a "my partners" tab 302 and a "suggested partners" tab 304. "My partners" tab 302 includes entities 308 that already have a relationship with the first entity. FIG. 4C illustrates "suggested partners" tab 304. The partners 314 are entities where an individual(s) from that entity already is collaborating with a person, team, or individual(s) from the first entity. In some embodiments suggested partners 314 are entities that are already established in teams database 182, but do not yet have a relationship recorded in teams database 182.

Figure 5:
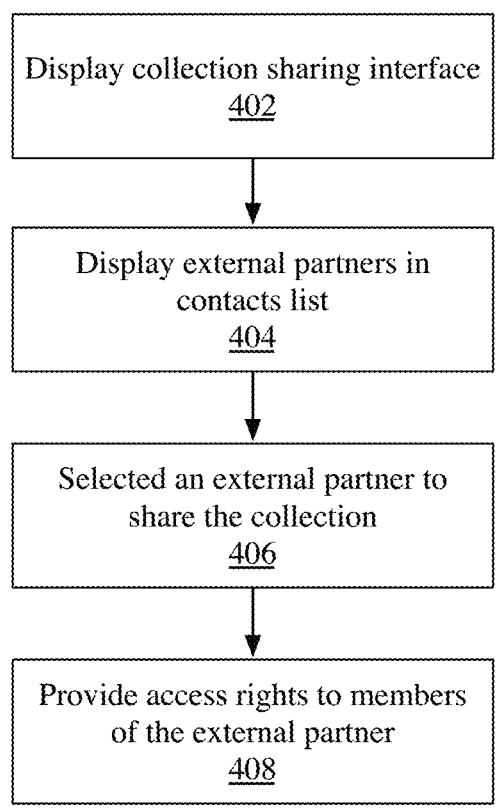
FIG. 5 shows an example method for sharing a collection using a collection sharing interface in accordance with some embodiments.

FIG. 5 illustrates an example method for adding a team of an external partner to share a collection (while this description predominately to sharing collections the present technology can also be used to share content items). The method begins when the user account associated with the first entity interacts with client device 150 and requests to display (402) a collection sharing interface.

Figure 6A:
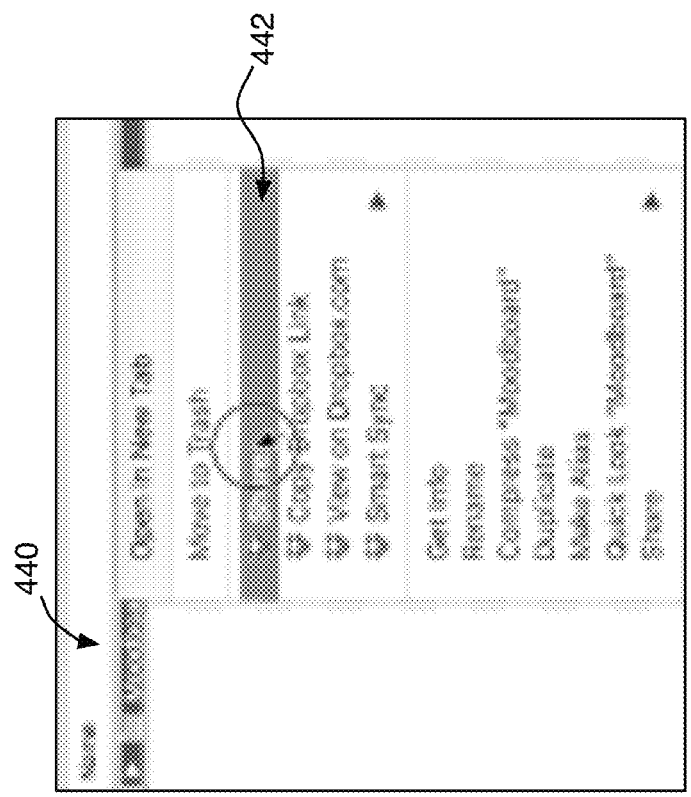
FIG. 6A and FIG. 6B show example collection sharing interfaces in accordance with some embodiments.
Figure 6B:
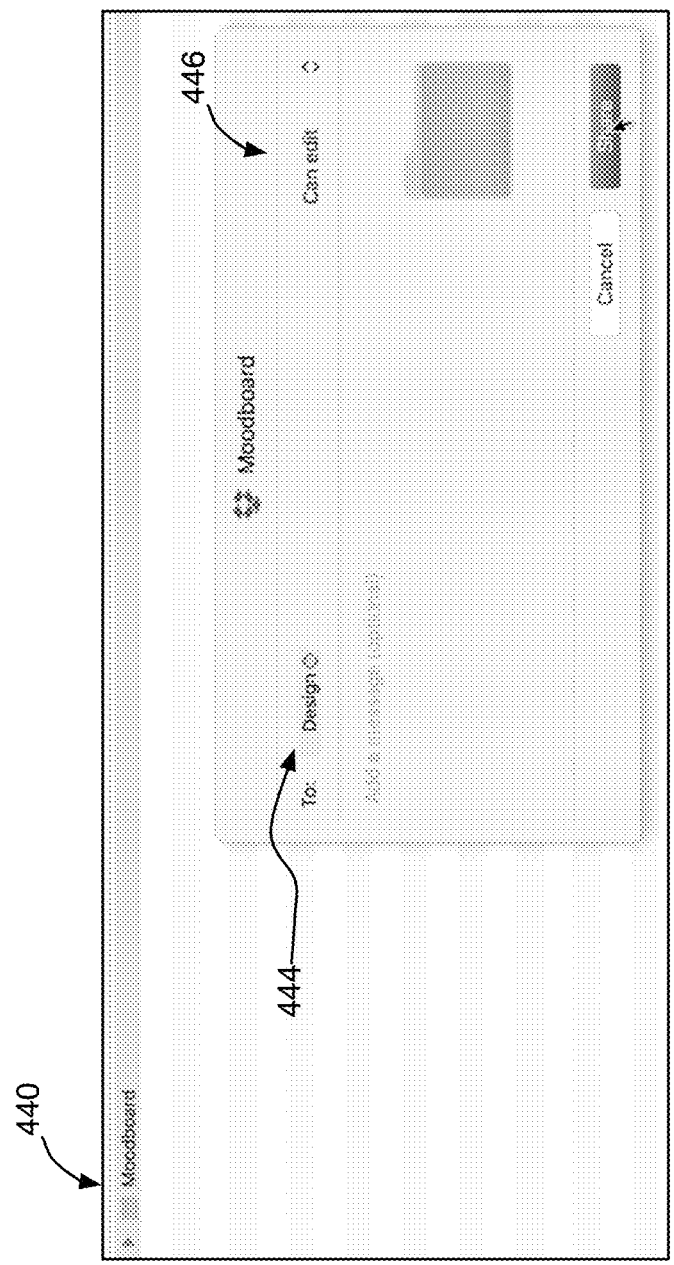

FIG. 6A and FIG. 6B illustrate example collection sharing interfaces. While these interfaces are configured to be displayed with local file system of client device 150, collection sharing interface could also be displayed in a web browser interacting with content management system 110. In FIG. 6A the user account selects folder icon 440 representing a collection and brings up a contextual menu (in some embodiments contextual menu is retrieved in response to a right-click on folder 440). The user account selects share 442 from the contextual menu which launches the interface illustrated in FIG. 6B.

As the user account interacts with selection area 444 in the interface illustrated in FIG. 6B, the interface can display (404) a list contacts including external partners to which the first entity has a relationship recorded in team relationship database 184, along with internal partners, and other contacts of the user account. The user account can select (406) an external partner with which to share the collection. In FIG. 6B user account has selected the design team from second entity "Company 7" and has given this team edit privileges 446 to collection 440. Team management service 180 can record the team-team relationship between the team to which the user accounts belongs, and the design team from the external entity, Company 7, and provide (408) appropriate access rights to members of the design team the external entity.

In some embodiments the access rights to members of the design team of the external entity can be recorded in access control list 145.

The present technology provides significant conveniences when it comes to sharing collections. First, the collection can be shared directly with the external team. A user account does not need to individually invite each member of the external team to share the collection. Additionally, any user associated with a team can also be provided with the features provided to the partner sharing the content item through its subscription, so both teams can collaborate more completely than merely sharing content items. Furthermore, both teams can suffer less disruptions from changes in a team since sharing is a the team level, individual leaving a team do not affect the sharing between remaining members of the team.

As described above with respect to FIG. 3, user accounts with administrator privileges are required to link partner entities together. However as described with respect to FIG. 5 any user account that has sufficient privileges to share the can invite teams from entities that are already considered partners of the first entity.

In some embodiments, team management service 180 can identify the type of relationship based on characteristics of the first team and the second team. For example when three or more teams are joined in a relationship, team management service 180 can identify this relationship as an alliance. However, when there is ambiguity in the type of relationship that has been formed, in some embodiments, team management service 180 can select a default relationship until the administrator of the first team changes the identity of the relationship. For example, when two teams are joined in a relationship, team management service 180 can label the relationship as a team-team relationship. However the relationship can be edited by an administrator of one of the teams if the more appropriate relationship is a team-subcontractor relationship.

In some embodiments only the administrator of the first entity is able to edit the relationship between the first entity and the second entity since the first entity is the one that has requested the relationship with the second entity. In such embodiments it can be assumed that the first entity is in control of that particular relationship.

Figure 7:
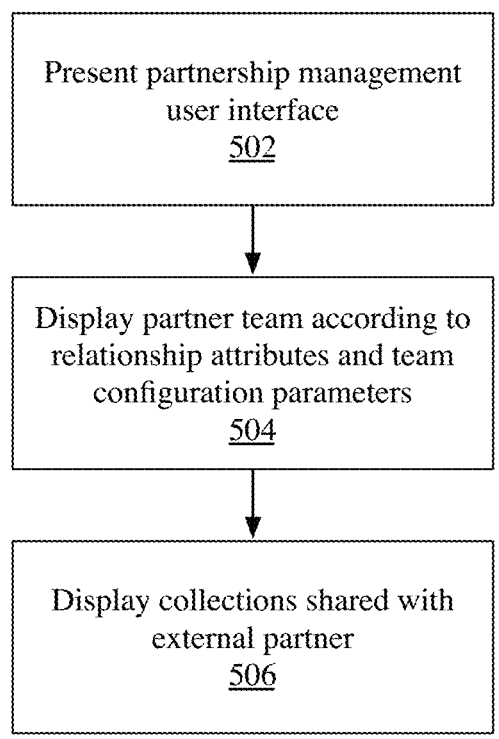
FIG. 7 shows an example method for displaying a partnership management user interface in accordance with some embodiments.
Figure 8A:
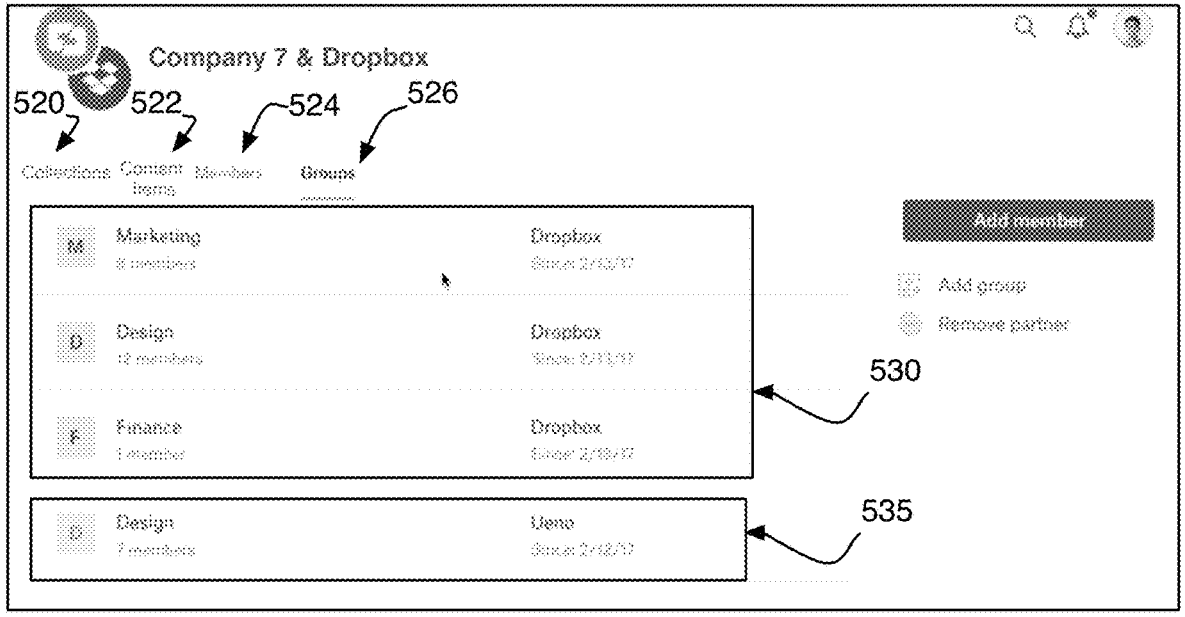
FIGS. 8A and 8B shows an example partnership management user interface in accordance with some embodiments.
Figure 8B:
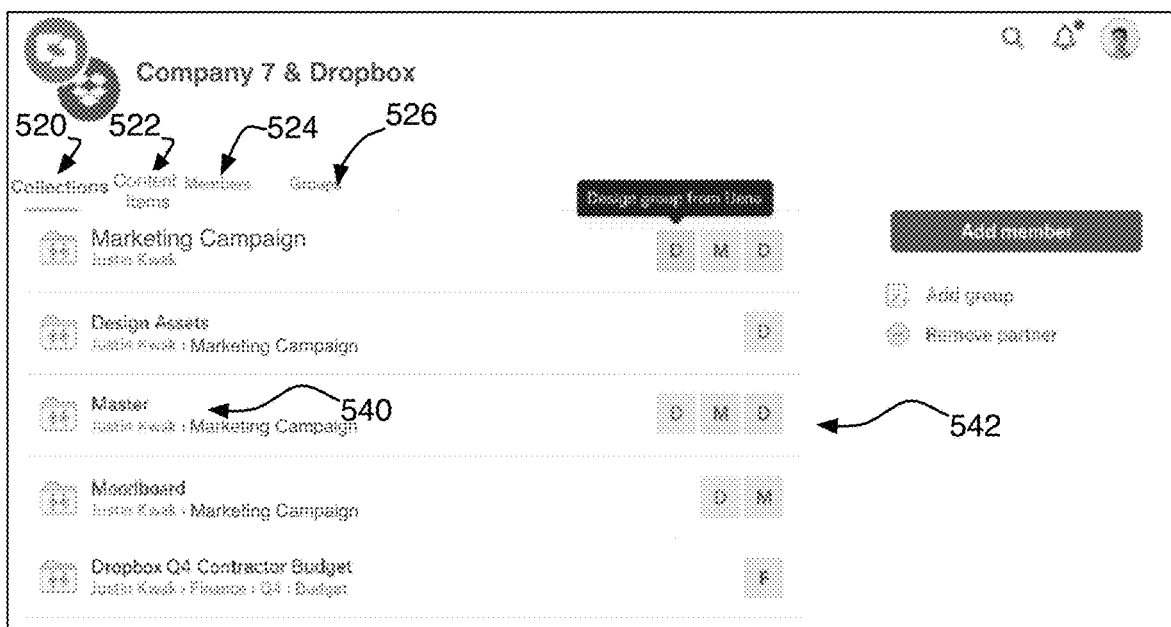

Once teams are joined in a recorded relationship, an administrator can view details of sharing through the relationship using a partnership management user interface. FIG. 7 illustrates an example method for displaying certain information using a partnership management interface. FIG. 8A and FIG. 8B illustrate example partnership management interfaces.

An administrator of one of the entities involved in a relationship can request that team management service 180 present (502) partnership management user interface as illustrated in FIG. 8A. At step 504 an administrator can request that partner teams are displayed (504) in the partnership management user interface.

As illustrated in FIG. 8A, the partnership management user interface includes multiple tabs including a tab for collections 520, content items 522, members 524, and groups 526. In FIG. 8A group tab 526 is displayed and shows teams exposed by the respective entities for this relationship. For example the first entity, Dropbox, has exposed teams 530 including a marketing team, a design team, and a finance team. While the second entity, Company 7, has exposed its design team 530.

In some embodiments, team management service 180 takes into account relationship attributes and other team configuration parameters when presenting the partnership management user interface. For example the second entity, Company 7, may itself be the result of a relationship between a team at second entity and a subcontractor. In such an example team management service 180 does not reveal the existence of the subcontractor when displaying teams exposed by the second entity.

Other team configuration parameters may also exist such as, but not limited to, parameters that may expose teams from the entity, hide individual members of each team, display or hide roles of such members, visibility of subcontractors, and visibility of team structures.

In step 506 an administrator can request that the partnership management user interface display (506) collections shared with the external partner. FIG. 8B illustrates the partnership management user interface when collections tab 520 has been selected. FIG. 8A shows several collections better shared between the first entity and the second entity and also shows which teams with which the collection is shared. For example collection 540 is shared between the design team of the second entity, and the marketing and design teams of the first entity.

Figure 9:
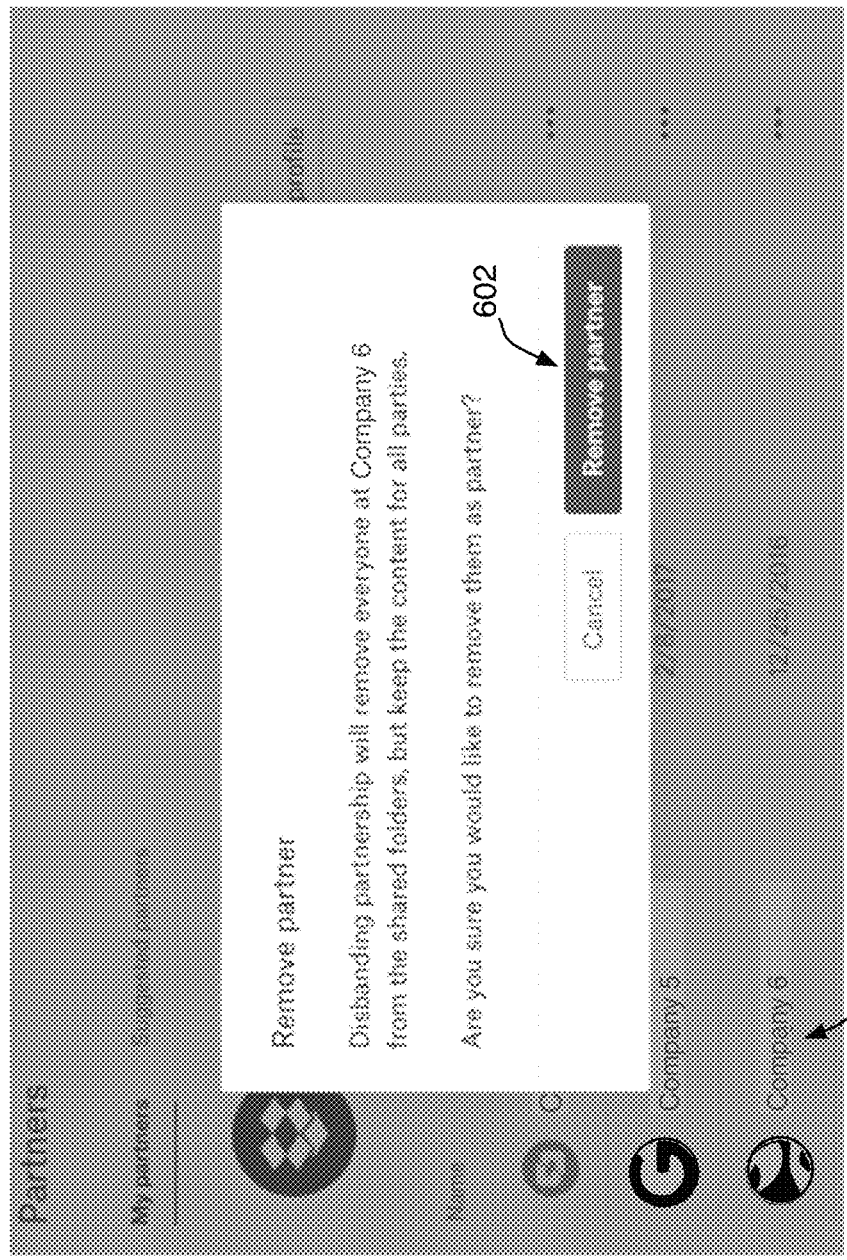
FIG. 9 shows an entity management user interface for removing a partner in accordance with some embodiments.

As illustrated in FIG. 9, at the end of the normal lifecycle of the collaboration an administrator can interact with entity management user interface to select an entity 604 and remove the entity using the remove button 602. This will end any relationship between teams of the first entity and the second entity.

Figure 10:
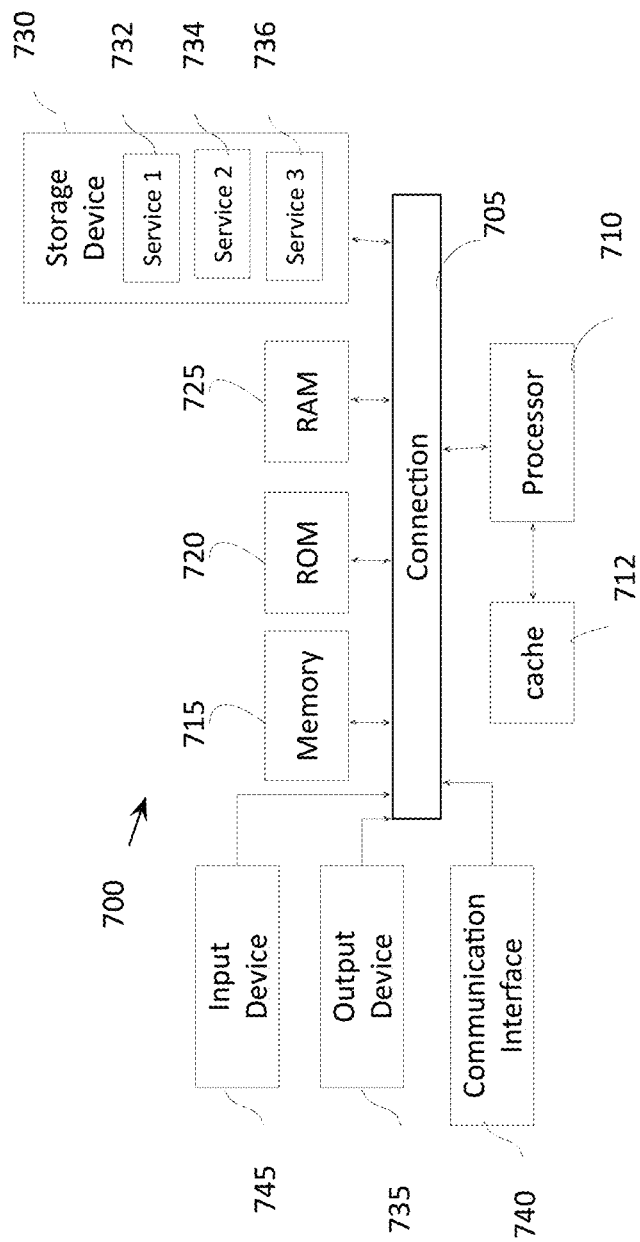
FIG. 10 shows an example of a system for implementing certain aspects of the present technology.

FIG. 10 shows an example of computing system 700. Computing system 700 can be for example a computing system of client device 150, or content management system 110. While these devices have some components in common, such as those illustrated in computing system 700, it should be appreciated that each of payment client device 150, or content management system 110 are specialized devices configured for their specific purposes.

In computing system 700 the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A content management system comprising:
   one or more processors;
   at least one computer-readable medium storing instructions which, when executed by the one or more processors, cause the content management system to:
   register a first administrator account for a first entity in response to a first account request associated with the first entity;
   register a second administrator account for a second entity in response to a second account request associated with the second entity, wherein the first entity, the second entity and the content management system are separate entities;
   receive a first input from the first administrator account for the first entity to configure a first team from the first entity and members of the first entity based on inviting user accounts within the first entity to be members of the first team;
   receive a second input from the second administrator account for the second entity to configure a second team from the second entity and members of the second entity;
   store first user accounts within the first entity associated with the first team and second user accounts within the second entity associated with the second team;
   store a collection of content items on the content management system in association with the first team from the first entity, the second team from the second entity lacking access to the collection of content items;
   receive a team management service input from the first administrator account of the first team from the first entity requesting to create a relationship with the second team from the second entity;
   store the relationship between the first team and the second team; and
   based on a third input from any one of the first user accounts of the first team from the first entity requesting to share the collection of content items with the second team from the second entity sharing the collection of content items with the second user accounts associated with the second team.

2. The content management system of claim 1, wherein in response to the team management service input, a confirmation is received from the second administrator account of the second entity, making teams of the second entity, including the second team, visible to the first team.

3. The content management system of claim 2, wherein the second team appears in a contacts list of at least one member of the first team due to the relationship between the first team and the second team.

4. The content management system of claim 2, wherein the teams visible to the first entity were selected by the second administrator account of the second entity to be exposed to the first entity.

5. The content management system of claim 4, wherein a partnership page displays to the first administrator of the first entity teams from the first entity exposed to the second entity and teams from the second entity exposed to the first entity.

6. The content management system of claim 5, the at least one computer-readable medium storing instructions which, when executed by the one or more processors, cause the content management system to:
   store configuration parameters for the second team set by the second administrator of the second entity, the configuration parameters identifying at least one of exposed teams, visibility of subcontractors, visibility of members of teams, visibility of team structures, and visibility of roles of team members.

7. The content management system of claim 1, wherein a partnership shared collection page is displayed showing teams from each entity sharing collections of content items.

8. The content management system of claim 1, wherein the third input from the one of the first user accounts of the first team from the first entity comprises a selection of the second team from a list of entities having a respective relationship with the first team, the list of entities comprising the second entity and one or more other entities.

9. The content management system of claim 1, the at least one computer-readable medium storing instructions which, when executed by the one or more processors, cause the content management system to:
   receive a fourth input from the first administrator account of the first team to create a relationship with a third team, wherein the second entity is a subcontractor and transparent to members of the third team and members of the subcontractor appear as members of the first team.

10. A non-transitory computer-readable medium comprising:
instructions stored thereon which, when executed by one or more processors, cause a computing device to:
register a first administrator account for a first entity in response to a first account request associated with the first entity;
register a second administrator account for a second entity in response to a second account request associated with the second entity, wherein the first entity, the second entity and the content management system are separate entities;
receive a first input from the first administrator account for the first entity to configure a first team from the first entity and members of the first entity based on inviting user accounts within the first entity to be members of the first team;
receive a second input from the second administrator account for the second entity to configure a second team from the second entity and members of the second entity based on inviting user accounts within the second entity to be members of the second team;
store first user accounts within the first entity defining the first team from the first entity and second user accounts within the second entity defining the second team from the second entity;
store a collection of content items in association with the first team from the first entity the second team from the second entity lacking access to the collection of content items;
receive an input from the administrator account of the first team from the first entity requesting to create a relationship with the second team from the second entity;
store the relationship between the first team and the second team; and
receive a third input in association with one of the first user accounts of the first team from the first entity to share the collection of content items with the second team from the second entity, wherein as a result of the received input to share the collection of content items the collection of content items is designated as shareable with the second user accounts for the second team.

11. The non-transitory computer-readable medium of claim 10, wherein the instructions are effective to cause the one or more processors to receive confirmation from the second administrator account of the second entity, making teams of the second entity, including the second team, visible to the first team.

12. The non-transitory computer-readable medium of claim 11, wherein the second team appears in a contacts list of at least one member of the first team due to the relationship between the first team and the second team.

13. The non-transitory computer-readable medium of claim 10, wherein the instructions are effective to cause the one or more processors to display a partnership shared collection page showing teams from each entity sharing collections of content items.

14. The non-transitory computer-readable medium of claim 10, wherein the instructions are effective to cause the one or more processors to receive a fourth input from the first administrator account of the first team to create a relationship with a third team, wherein the second entity is a subcontractor and is transparent to the members of the third team and thereby the members of the subcontractor appear as members of the first team.

15. A method comprising:
registering, with a content management system, a first administrator account for a first entity in response to a first account request associated with the first entity;
registering, with a content management system, a second administrator account for a second entity in response to a second account request associated with the second entity, wherein the first entity, the second entity and the content management system are separate entities;
receiving, by the content management system, a first input from the first administrator account for the first entity to configure a first team from the first entity and members of the first entity based on inviting user accounts within the first entity to be members of the first team;
receiving, by the content management system, a second input from the second administrator account for the second entity to configure a second team from the second entity and members of the second entity based on inviting user accounts within the second entity to be members of the second team;
storing, by the content management system, first user accounts within the first entity defining the first team from the first entity and second user accounts within the second entity defining the second team from the second entity;
storing, by the content management system, a collection of content items in association with the first team from the first entity, the second team from the second entity lacking access to the collection of content items;
receiving, by the content management system, a team management service input from the first administrator account of the first team from the first entity requesting to create a relationship with the second team from the second entity;
storing the relationship between the first team and the second team; and
in response to receiving, by the content management system, a third input in association with one of the first user accounts of the first team from the first entity to share the collection of content items with the second team from the second entity, sharing the collection of content items with the second user accounts for the second team.

16. The method of claim 15, further comprising:
in response to the team management service input, a confirmation is received from the second administrator account of the second entity, making teams of the second entity, including the second team, visible to the first team.

17. The method of claim 15, further comprising:
receiving a fourth input from the first administrator account of the first team to create a relationship with a third team, wherein the second entity is a subcontractor and is transparent to the members of the third team and thereby the members of the subcontractor appear as members of the first team.

* * * * *